(12) United States Patent
Sublette et al.

(10) Patent No.: US 6,471,864 B1
(45) Date of Patent: Oct. 29, 2002

(54) ADSORBENT BIOCATALYST POROUS BEADS

(75) Inventors: Kerry L. Sublette; William A. Redman, both of Tulsa, OK (US); Thomas I. Bair, Wilmington, DE (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 09/728,962

(22) Filed: Dec. 4, 2000

Related U.S. Application Data

(60) Provisional application No. 60/168,484, filed on Dec. 2, 1999.

(51) Int. Cl.$^7$ .................................................. C02F 3/00
(52) U.S. Cl. ........................ 210/616; 210/679; 210/150
(58) Field of Search ................................. 210/615–619, 210/150–151, 679

(56) References Cited

U.S. PATENT DOCUMENTS 5,486,292 A * 1/1996 Bair et al.

OTHER PUBLICATIONS

US Trademark Registration No. 2120214 for BIO–SEP (published for opposition Dec. 26, 1995).*
CRC Handbook of Chemistry & Physics 59$^{th}$ ed., 1978, solubility properties of DMAc at p. C–84.*
Bio–Sep: An Advanced Biocatalyst Support System For Groundwater and Wastewater Treatment; by Kerry L. Sublette, Steve Harmon and Carl Camp, 2000.

* cited by examiner

Primary Examiner—Chester T. Barry
(74) Attorney, Agent, or Firm—Head, Johnson & Kachigian

(57) ABSTRACT

Highly porous, adsorbent biocatalyst beads of poly(hexamethyleneadipamide) or poly(caproamide) polymer having powdered activated carbon dispersed throughout the polymer and biocatalytic material, such as bacteria, located within macropores of the beads, are highly useful and relatively inexpensive polymeric beads, compared to similar known aramid beads, in removing organic and/or some inorganic contaminants from aqueous streams. The biocatalytic material consumes the organic and/or some inorganic contaminants which are adsorbed by the activated carbon and metabolizes the contaminant into harmless products, while continuously renewing the adsorptive capacity of the activated carbon.

6 Claims, 3 Drawing Sheets

ADSORBENT BIOCATALYST POROUS BEADS

CROSS-REFERENCE TO RELATED APPLICATIONS

Priority is claimed from provisional application U.S. Ser. No. 60/168,484 filed on Dec. 2, 1999 and incorporated by reference herein.

BACKGROUND OF THE INVENTION

1. Field of the Invention.

This invention relates to porous polymeric beads that have finely divided particles of activated carbon dispersed within the polymer and have biocatalytic material contained in macropores within the beads. The beads of the invention are useful in separating small quantities of organic and inorganic contaminants from solutions and are particularly efficient in removing deleterious chemicals from aqueous streams.

2. Prior Art.

U.S. Pat. No. 5,486,292, Bair and Camp, the entire disclosure of which is hereby incorporated by reference herein, provides an excellent review of known methods aimed at significantly decreasing the concentrations of various metals and dissolved organic contaminants from aqueous streams. The patent notes that several of the then known methods involved the use of bioreactors loaded with porous polymeric beads containing particular extractants. However, the polymeric beads of the then known methods had one or more of several shortcomings, such as excessive friability, insufficient rigidity, difficulty in retaining or sealing the extractant within the beads, limited capacity, limited effective life, inadequate density to avoid floating in water, excessive swelling in water etc.

The aim of the invention described in U.S. Pat. No. 5,486,292 was to provide a bioreactor in the form of polymeric beads which removes low concentrations of contaminants from streams for long periods of time. To accomplish this task, U.S. Pat. No. 5,486,292 suggests an improved bioreactor in which biocatalyst material is supported within porous synthetic organic polymer beads having activated carbon powder dispersed within the polymer of the beads and the biocatalyst material being located within macropores of the bead, the carbon powder preferably amounting to 2.3 to 7 times the weight of the polymer and the bead typically having a BET specific surface area (indicative of microporosity) of at least 400 square meters per gram, a mercury intrusion volume (indicative of macroporosity) in the range of 1.8 to 2.5 cubic centimeters per gram and a void volume of at least 40% of the total volume of the bead. Preferably, the biocatalyst is a community of bacteria, which typically are selected so that an organic chemical that is adsorbed by the activated carbon powder will be metabolized by the bacteria. Preferred polymers for the beads, and the only polymers specifically illustrated in U.S. Pat. No. 5,486,292 are aramid polymers (Nomex), selected from poly(m-phenylene isophthalamide) and copolymers thereof, and a polymer or copolymer formed from terephthalic acid, isophthalic acid, m-phenylene diamine and 2,4-diaminobenzene sulfonic acid. A method for making such beads, inoculating them with biocatalyst and using them successfully to remove contaminants from various liquid streams are disclosed in the patent. The patent suggests that activated-carbon-powder-loaded polymeric beads having substantially the same macroporosity and the same microporosity as those described and claimed in the patent would provide substantially the same favorable results in decontaminating various streams as did the specifically described activated-carbon-powder-loaded aramid polymer porous beads. However, such aramid polymers are quite expensive and manufacture of beads therefrom often involves the use of toxic organic solvents.

In view of the situation. described in the preceding paragraph, work was undertaken by the present inventors to prepare porous beads having characteristics similar to those set forth for the polymeric bioreactor beads of U.S. Pat. No. 5,486,292 from polymers other than aramids. The present inventors have found that two specific Nylon polymers could function about as well as the aramid beads disclosed in U.S. Pat. No. 5,486,292. The term Bio-Sep refers to an activated carbon loaded polymeric bead (Nylon or Nomex).

SUMMARY OF THE INVENTION

The invention provides an improved bioreactor, which includes porous polymeric beads that have finely divided particles of activated carbon dispersed within the polymer and have biocatalytic material contained in macropores within the beads. The improvement of the present invention comprises the bead polymer being poly(hexamethyleneadipamide), also known as and referred to herein as Nylon 66, or poly(caproamide), also known as and referred to herein as Nylon 6. The carbon powder typically amounts to about ¾ to 7 times the weight of the polymer and the bead typically has a BET specific area (indicative of microporosity) of at least about 100 square meters per gram, a mercury intrusion volume (indicative of macroporosity) in the range of about 1.2 to about 2.5 cubic centimeters per gram, and a void volume of at least about 40% of the total volume of the bead.

The invention also provides an improved process for the detoxification of an aqueous waste stream containing a chemical contaminant. The process is of the type that includes the steps of (a) passing the waste stream through a bioreactor formed of porous synthetic polymer beads having macropores and micropores, activated carbon powder dispersed throughout the polymer and bacterial biocatalyst material supported with the macropores of the porous synthetic polymer beads, (b) adsorbing the organic contaminant onto the activated carbon powder particles of the bioreactor beads, (c) the bacterial biocatalyst material within the macropores of the bead metabolizing the adsorbed chemical contaminant to water, carbon dioxide, nitrogen and/or other innocuous products and thereby regenerating the adsorbent capacity of the carbon powder, and (d) discharging from the bioreactor an aqueous stream that is substantially free of the contaminant. The improvement in the process comprises the polymer of the porous bead being Nylon 66 or Nylon 6, Nylon 66 being preferred. The process of the invention is particularly useful in separating small quantities of organic contaminants from solutions and in efficiently adsorbing potentially toxic organic chemicals from aqueous streams.

While an important aspect of the present invention is the discovery that Nylon is an excellent polymer for formation of adsorbent biocatalyst porous beads, other polymers soluble in water-miscible organic solvents but substantially insoluble in water will also be usable once optimal bead-forming conditions are found. These other polymers include: polyacrylonitrile (Orlon); polyurethane; polyurethane/polyether copolymers (including Lycra); acetylated cellulosic polymers; and acetylated polyvinyl alcohols.

An important aspect of the present invention is a bioreactor comprising porous polymeric beads having finely divided particles of activated carbon powder dispersed therein and having biocatalytic material contained in macropores of the beads, the polymer being soluble in a water miscible organic solvent and substantially insoluble in water.

A more general aspect of the invention is an improved bioreactor comprising porous polymeric beads having finely divided particles of activated carbon powder dispersed therein and having biocatalytic material contained in macropores of the beads, the improvement comprising the polymer being poly(hexamethyleneadipamide) or poly(caproamide).

One important embodiment of the present invention is a bioreactor comprising porous polymeric beads having finely divided particles of activated carbon powder dispersed therein and having biocatalytic material contained in macropores of the beads, the polymer being poly(hexamethyleneadipamide) or poly(caproamide). The polymer soluble in a water miscible organic solvent is substantially insoluble in water may be, for example, at least one of polyacrylonitrile; polyurethane; polyurethane/polyether; and acetylated cellulosic polymer and acetylated polyvinyl alcohol. Generally, the carbon powder amounts to between about to between ¾ and about 7 times the weight of the polymer when preparing the macroporous beads.

The preferred bioreactor of the present invention has a BET surface area, indicative of microporosity, of at least about 100 square meters per gram (100 $m^2/g$). This bioreactor also has a mercury intrusion volume, indicative of macroporosity, in the range of about 1.2 to about 2.5 cubic centimeters per gram. This bioreactor also has a void volume of at least about 40% of total bead volume.

The present invention comprises an improved process for the detoxification of an aqueous waste stream containing an organic chemical contaminant, the process comprising the steps of (a) passing the waste stream through a bioreactor having porous synthetic polymer beads with macropores and micropores, activated carbon powder dispersed throughout the polymer and bacterial biocatalyst material supported within the macropores or micropores of the porous synthetic polymer beads, (b) adsorbing the organic contaminant onto the activated carbon powder particles of the bioreactor beads, (c) the bacterial biocatalyst material within the macropores of the bead metabolizing the adsorbed chemical contaminant to water, carbon dioxide, nitrogen and other innocuous products and thereby regenerates the adsorbent capacity of the activated carbon powder, and (d) discharging from the bioreactor an aqueous stream that is substantially free of the contaminant, the improvement comprising the polymer of the porous bead being poly(hexamethyleneadipamide) or poly(caproamide).

The present invention also involves an improved process for the detoxification of an aqueous waste stream containing inorganic compounds such as, e.g., ammonia, hydrogen sulfide, and nitrite salts, the process comprising the steps of (a) passing the waste stream through a bioreactor with porous synthetic polymer beads having macropores and micropores, and bacterial biocatalyst material supported within the macropores or micropores of the porous synthetic polymer beads, (b) the bacterial biocatalyst material within the macropores of the bead oxidizing the inorganic compound to innocuous products and (c) discharging from the bioreactor an aqueous stream that is substantially free of the ammonia, wherein the polymer of the porous bead is poly(hexamethyleneadipamide) or poly(caproamide). Polymer incorporated activated carbon is not needed in the case of most inorganic compounds that are not adsorbed thereon.

One important aspect of the present invention is a process for producing polymeric beads containing dispersed activated carbon particles. This process comprises forming a mixture of activated carbon particles and a polymer dissolved in a water miscible organic solvent; and extruding said mixture through at least one nozzle to form drops falling into an aqueous solution where the polymer forms porous polymeric beads containing dispersed activated carbon particles; wherein the nozzle is formed from a low surface energy material, has an orifice that at its drop forming end has an upward sloping surface to minimize or avoid excess liquid adhesion and thus micro-drop formation.

DETAILED DESCRIPTION OF PREFERRED EMBODIMENTS

Figure 1:
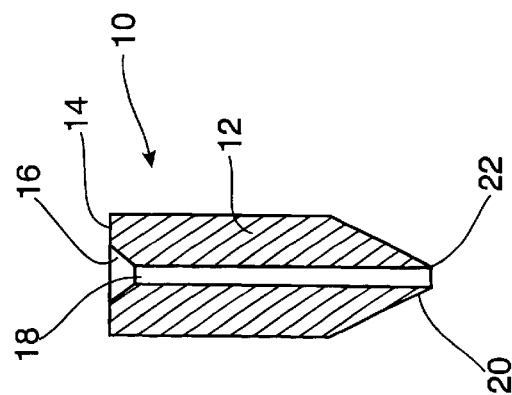
FIG. 1 shows a nozzle design for producing polymer-PAC beads in accordance with the present invention.

The following descriptions of preferred embodiments of the invention are included for the purposes of illustration and are not intended to limit the scope of the invention, which scope is defined by the appended claims.

The bioreactor of the present invention is of the general type that is disclosed in U.S. Pat. No. 5,486,292. As noted above in the summary description of the invention, such known bioreactors include porous polymeric beads that have finely divided particles of activated carbon dispoersed within the polymer and have biocatalytic material contained in macropores within the beads. The only type of synthetic organic polymer illustrated specifically in U.S. Pat. No. 5,486,292 is aramid polymer. The improvement of the present invention comprises the bead polymer being Nylon 66 or Nylon 6. It was surprising that, other than the aramid polymer of U.S. Pat. No. 5,486,292, of all the polymers considered and/or tested by the present inventor, only the Nylon 66 and the Nylon 6 polymers provided porous polymeric beads suitable for the bioreactors of the present invention. It was also surprising that the two Nylon polymers for use in the present invention could be somewhat outside the specific porosity and carbon powder concentration ranges set forth in U.S. Pat. No. 5,486,292, and still perform very well, when inoculated with biocatalytic material, in removing organic contaminants from aqueous streams. Further, the bioreactors of the present invention provide two alternative polymeric bead materials, which permit the ratio of cost to decontamination effectiveness to be favorably affected.

The current invention also relates to a nozzle design to be used to produce uniform droplets of a slurry of polymer dissolved in a water miscible organic solvent and suspended powdered activated carbon (PAC). Droplets thus formed fall from an appropriate height into an aqueous quenching solution in which the polymer precipitates forming a porous, roughly spherical bead with impregnated PAC. The disclosed design of the nozzle prevents secondary breakup of droplets after leaving the nozzle thus preventing the formation of microbeads which can foul bioreactor system components using the polymer/PAC beads as an immobilization matrix for microorganisms.

In accordance with the present invention, the carbon powder dispersed within the porous beads of Nylon polymer typically amounts to about ¾ to about 7 times, preferably about 1 to 4 times, the weight of the polymer. The bead typically has a BET specific surface area (indicative of microporosity) of at least about 100 square meters per gram. The bead typically also has a mercury intrusion volume (indicative of macroporosity) in the range of about 1.2 to about 2.5 cubic centimeters per gram, preferably about 1.8 to 2.5 cm$^3$/g, and a void volume of at least about 40% of the total volume of the bead.

The carbon-containing beads of the invention, as noted above, possess a high macroporosity; i.e., they contain many large pores, referred to herein as "macropores" and may be referred to herein as porous beads. When the beads are inoculated with biocatalytic material, such as bacteria, the bacteria enter the macropores, grow therein, and become substantially immobilized within the macropores. In this manner each bead becomes a bioreactor and provides an environment for the removal of organic or inorganic wastes from water. The activated carbon dispersed throughout the polymer bead provides a surface in which organic contaminants can be adsorbed from waste water streams. The macroporous structure of the bead not only provides a home for the bacteria, but it also protects the bacteria from the flow shear of water passing through a treatment tank or bed containing the beads. Even relatively high stream flows are not harmful to the bacteria contained in the beads. The bacteria, or biocatalytic material, are(is) not washed out and lost from the beads.

The macroporous structure of the beads provides chambers in which the biocatalytic material and the activated carbon powder are in close contact with each other. The close contact allows the biocatalytic material to efficiently metabolize the organic contaminants that are adsorbed on the surface of the activated carbon powder particles, while at the same time, regenerating the adsorptive capacity of the carbon. This synergistic combination of biocatalytic material and activated carbon powder within the macropores of the bead results in a rapid rate of degradation of organic materials so that organic contaminants often can be successfully removed from a contaminated aqueous stream in one pass of the stream through a bed of the beads. Each discrete bead, infused with bacteria, is a complete bioreactor, that in one step removes organic waste from a contaminated stream and converts it into innocuous products. The biocatalytic porous Nylon beads of the invention are strong (i.e., not readily crushed), heavier than water, coherent (i.e., not easily broken into pieces) and easily dispersed into and removed from treatment tanks or beds.

A preferred method for preparing the adsorbent porous Nylon beads suitable for use in the present invention is as follows. Powdered activated carbon is added to a solution of Nylon polymer in solvent (e.g., Nylon 66 in formic acid) to form a slurry of activated powder in the polymer solution. The concentration of polymer in the solution can be within a wide range (e.g., 5 to 20%). The weight of activated carbon within the slurry typically amounts to about ¾ to about 7 times the weight of the Nylon polymer. Preferably, the carbon powder amounts to about 1 to 4 times the weight of the Nylon polymer in the slurry. The slurry is thoroughly mixed. Thereafter, the slurry is forwarded to orifices that cause droplets of the slurry to fall through a non-coagulating zone (e.g., air) of about 1 to 20 inches in length (5 to 45 cm) into a coagulating bath (.e.g., water, dilute sodium hydroxide, dilute formic acid or the like), wherein the solvent is removed from the droplet to transform the droplet into an adsorbent porous Nylon bead. The beads are then removed from the water and washed to remove residual solvent. Beads formed by this method typically have diameters in the range of 0.5 to 5 mm or larger. The shape of the beads can be modified by, among other things, changing the rate at which the slurry is passed through the orifices, the length of the non-coagulating zone, and the viscosity of the droplets. The size and volume of the pores that are formed in the Nylon 66 and Nylon 6 beads can be adjusted by controlling the concentration of the solvent in the polymer solution.

While an important aspect of the present invention is the discovery that Nylon is an excellent polymer for formation of adsorbent bio-catalyst porous beads, other polymers soluble in water-miscible organic solvents but substantially insoluble in water will also be usable once optimal bead-forming conditions are found. These other polymers include: polyacrylonitrile (Orlon); polyurethane; polyurethane/polyether copolymers (including Lycra); acetylated cellulosic polymers; and acetylated polyvinyl alcohols.

The test procedures for measuring the BET specific surface area, the mercury intrusion volume and other characteristics of the porous Nylon beads of the present invention are set forth in U.S. Pat. No. 5,486,292, column 5, lines 26–48, which disclosure has been incorporated by reference.

EXAMPLES

The invention is illustrated in the following Examples, which are not intended to limit the scope of the invention, the scope being defined by the claims below.

Example 1

This example, in accordance with the invention, demonstrates (a) the preparation of coherent porous poly (hexamethyleneadipamide) [Nylon 66] polymeric beads containing activated carbon powder, (b) inoculation of the beads with a biocatalyst and (c) the ability of the thusly prepared bioreactor beads to remove an organic contaminant from an aqueous stream.

A solution of 8.0 grams of poly (hexamethyleneadipamide) in 68.0 grams of formic acid is prepared. Twenty-four grams of activated carbon powder (PCB-G grade, obtained from Calgon Carbon Co. of Pittsburgh, Pa.) are stirred into the solution to form a homogeneous slurry. The slurry is then fed by gravity flow through a medicine dropper (bought from Fisher Scientific of Lexington, Mass.), which measured 3-inches (7.2 cm) long and had a 2-mm diameter opening in its tip. Droplets of the slurry fall from the dropper tip through the air for a distance of about 3 inches (7.2 cm) long into a bath of water dilute aqueous sodium hydroxide or dilute formic acid. The resulting beads, which are roughly spherical in shape, are washed repeatedly with water to remove substantially all traces of sodium hydroxide or formic acid.

Visual inspection of a magnified cross-section of the thusly prepared beads shows that the beads have a highly porous structure, which is similar to the structure of the porous activated-carbon-containing aramid beads of U.S. Pat. No. 5,486,292.

The porous beads of Nylon 66 containing activated carbon powder prepared as described in the preceding paragraphs of this example are added to an equal volume of water in an Erlenmeyer flask. The thusly formed mixture is vigorously shaken for several hours on a shaker table. The beads remain coherent and show no sign of disintegration.

A slurry of ammonia-oxidizing bacteria in water is added to the Nylon 66/carbon porous beads in the Erlenmeyer flask. The mixture is shaken for several hours and thereafter removed from the flask and rinsed with water. The beads are placed in a clean flask with an equal volume of water. A few milliliters of dilute solution of ammonium sulfate (about 1%) is added. Bioactivity of the beads is demonstrated by measuring the ammonia content of the water. The ammonia content of the water decreases substantially within a 24-hour period.

When porous bioreactor beads of Nylon 66 containing activated carbon and biocatalytic material are prepared, similar to the beads described above in this example, with carbon-to-polymer ratios 1:1 and 2:1, coherent porous beads according to the invention are obtained. In each case, the beads exhibit good bioactivity in reducing the ammonia content of a water test sample within a 24-hour period.

Example 2

Example 1 is repeated with Nylon 6 being substituted for the Nylon 66 of Example 1. Favorable results are obtained, similar to those obtained with the beads in Example 1.

Example 3

Nozzle Design for Producing Polymer-PAC Beads (see FIG. 1)

The disclosed design of a nozzle 10 prevents secondary breakup of droplets after leaving the nozzle 10, thus preventing the formation of microbeads which can foul bioreactor system components using the polymer/PAC beads as an immobilization matrix for microorganisms. The bead-making nozzle 10 is usually constructed of a Teflon, polyethylene or other inert low surface-energy rod 12. The rod 12 is of a diameter to fit into an appropriate fitting, e.g., Swagelok, for a slurry or liquid feed stream. Nominally, this diameter is 0.5 inches, but can be larger or smaller when necessary for drop-forming, economic or other reasons.

A top end 14 of the rod 12 inserts into a Swagelok or other fitting (not shown) and is usually countersunk 16 in order to facilitate flow through an orifice 18. The countersink 16 is primarily to facilitate and speed flow, thereby minimizing settling in a flowstream. This is not critical to the functioning of the nozzle 10.

The orifice 18 may be of any diameter that will allow drop formation from the slurry. In the case of a Nomex/PAC slurry, the preferred orifice 18 diameter range is from about Wire Gauge 56 (0.0465 inches) to about 47 (0.0785 inches).

An important property of the nozzle 10 design is a tip 20. Typically, standard nozzle tips are flat across the bottom. A flat-ended tip, even when made of a low surface-energy material, allows a modest amount of wetting of the fluid across the surface. When the drop forms and is beginning to fall from a standard nozzle tip, but before detachment, a liquid bridge exists between the bulk of the drop and the wetted surface along the bottom of the nozzle tip. As the drop breaks and falls off, minor droplets form from the liquid bridge. When slurries or liquids are used that involve solidification upon exit of a standard nozzle, for example quenching slurries, these small droplets can form smaller solid beads that contaminate the solid beads that are the desired primary product. This contamination can severely hinder utilization of the primary product by fouling screens, pumps, etc. Separation of the smaller beads from the larger ones can be complicated, incomplete and difficult.

The nozzle 10 tip 20 design incorporates the force of gravity to offset the wetting forces along the bottom 22 of the nozzle 10 tip 20. This is accomplished by sloping or tapering the body of the nozzle 10 upward and away from the opening of the orifice 18. The slope is angled enough to prevent any wetted area outside the orifice 18. Because the weight of the slurry under the gravity field will offset the wetting forces, and thereby only allow an absolute minimum of wetted area outside the orifice 18 itself, no wetted area will form. Consequently, no bridge and no small droplets are formed. This inhibits or prevents the formation of small droplets. This is industrially important in all drop formations in which a solid is formed from a liquid drop and uniformity of product is desired.

Example 4

Bio-Sep Loading Experiment

This experiment was conducted to compare the biomass loading of Nomex and Nylon Bio-Sep beads under identical operating conditions. Twenty mL bulk volume of Nomex or Nylon Bio-Sep beads (roughly 500 beads) were transferred to each of four 250-mL Erlenmeyer flasks (4 flasks with Nylon beads and 4 flasks with Nomex beads). To each flask was added 100 mL of a mineral salts medium containing benzoic acid (3.0 g/L) as the sole carbon and energy source. Each flask was then inoculated with biomass collected by centrifugation of 50 mL of activated sludge from the recycle line of a refinery activated sludge treatment system. All flasks were plugged with cotton and cheese cloth and then incubated at 30 C in a table top incubator shaker. Rotary shaking of the flasks provided aeration of the cultures through gas exchange at the liquid surface.

Figure 2:
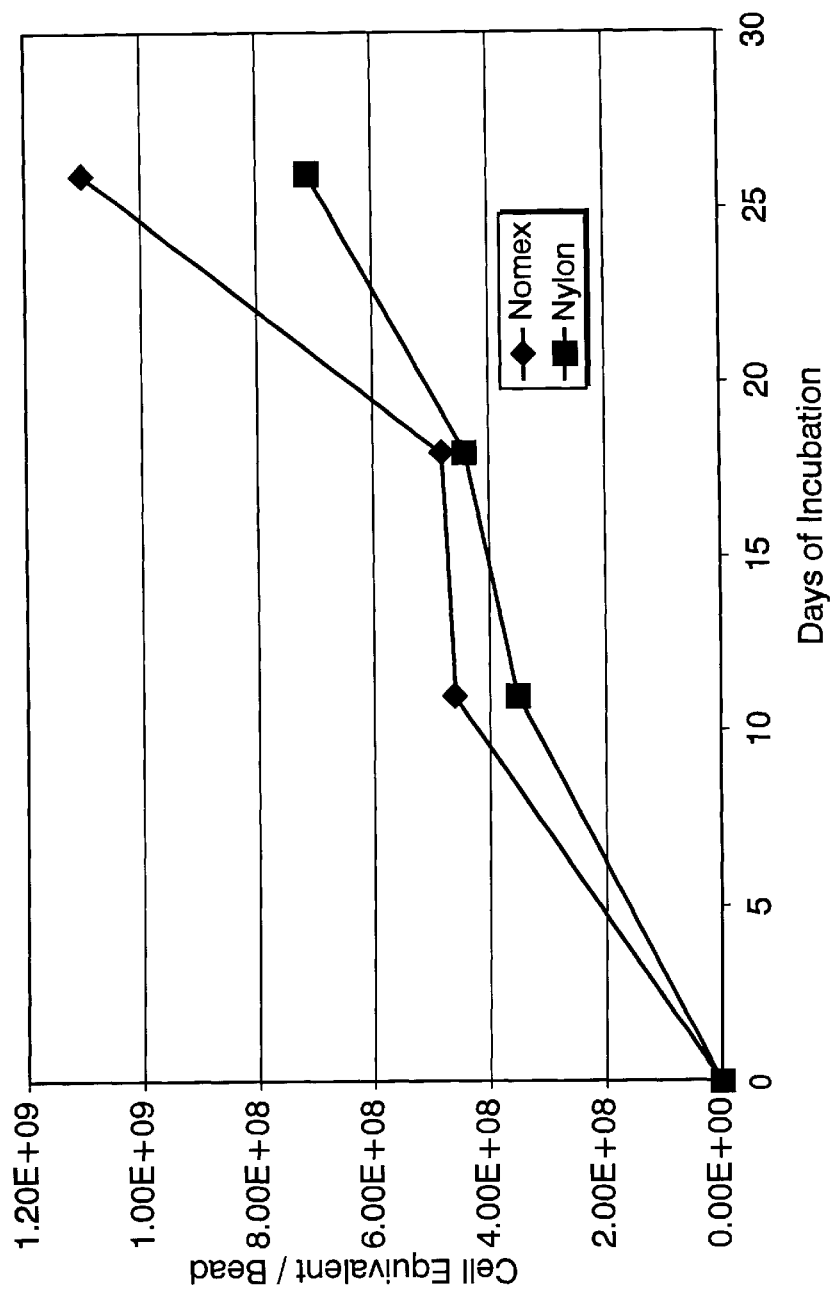
FIG. 2 is a graph showing the inoculation of Nomex and Nylon Bio-Sep beads with hydrocarbon degrading bacteria.

Each day flasks were removed from the incubator and the culture medium decanted and discarded, leaving wetted beads. Each flask was then replenished with the benzoic acid medium and returned to the incubator. Periodically 3–5 beads were removed from each flasks and pooled to produce a composite sample of Nylon or Nomex beads from the cultures. Each sample was washed repeatedly with fresh medium until a clear washing was obtained. Beads were then shipped at 4° C. by overnight delivery to an outside laboratory (Microbial Insights, Rockford, Tenn.) for analysis of phospholipid fatty acids (PLFA) contained within the beads. Total PLFA is proportional to the total viable biomass within the bead. Cell numbers were measured using a conversion factor of $2 \times 10^4$ cells per picomole PLFA (White, D. C.; Pinkart, H. C.; and Ringelberg, D. R., "Biomass Measurements: Biochemical Approaches", in *Manual of Environmental Microbiology*, C. J. Hurst, Ed., ASM Press, Washington, D.C. (1997)). Results of these analyses are shown in FIG. 2. As seen here, Nylon Bio-Sep beads were loaded with biomass at approximately the same rate and to approximately the same extent as Nomex Bio-Sep beads.

Example 5

Nylon and Nomex Bio-Sep beads were compared to each other, and to the powdered activated carbon (PAC) used to make the beads, in terms of surface area per g of bead (or PAC). Samples of Nomex and Nylon Bio-Sep beads or PAC were dried for 6 hours at 40° C. with a continual flush of dry nitrogen. Samples of beads or PAC were transferred to a Quantachrome Autosorb Gas Sorption System to obtain a BET adsorption isotherm for each sample using nitrogen as the adsorbed species. From these data were calculated the surface area per g (see Table 1) average pore diameters shown in Table 2.

Example 6

Dissolved Oxygen Uptake Experiments

Figure 3:
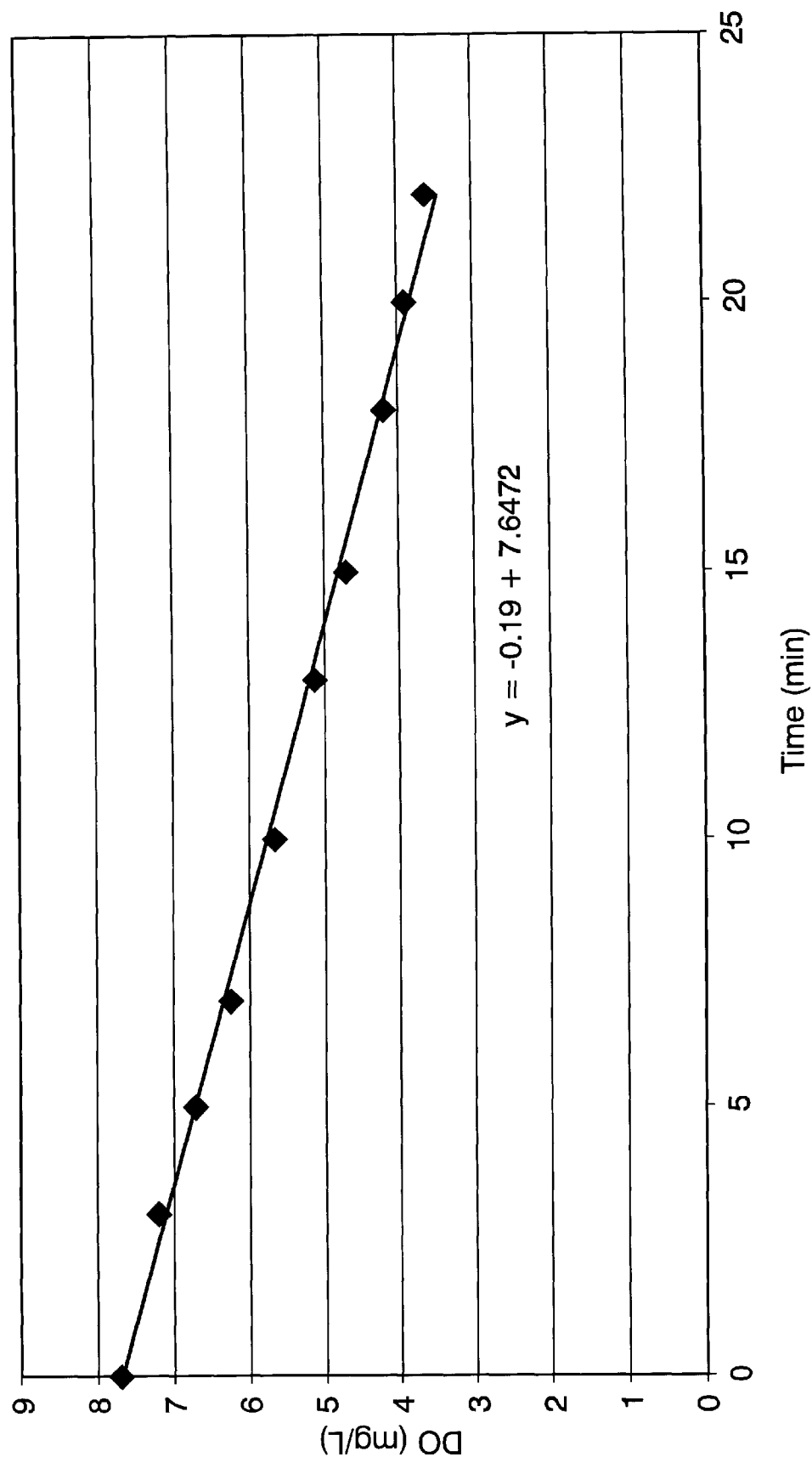
FIG. 3 is a graph showing the DO uptake for Nomex Bio-Sep.
Figure 4:
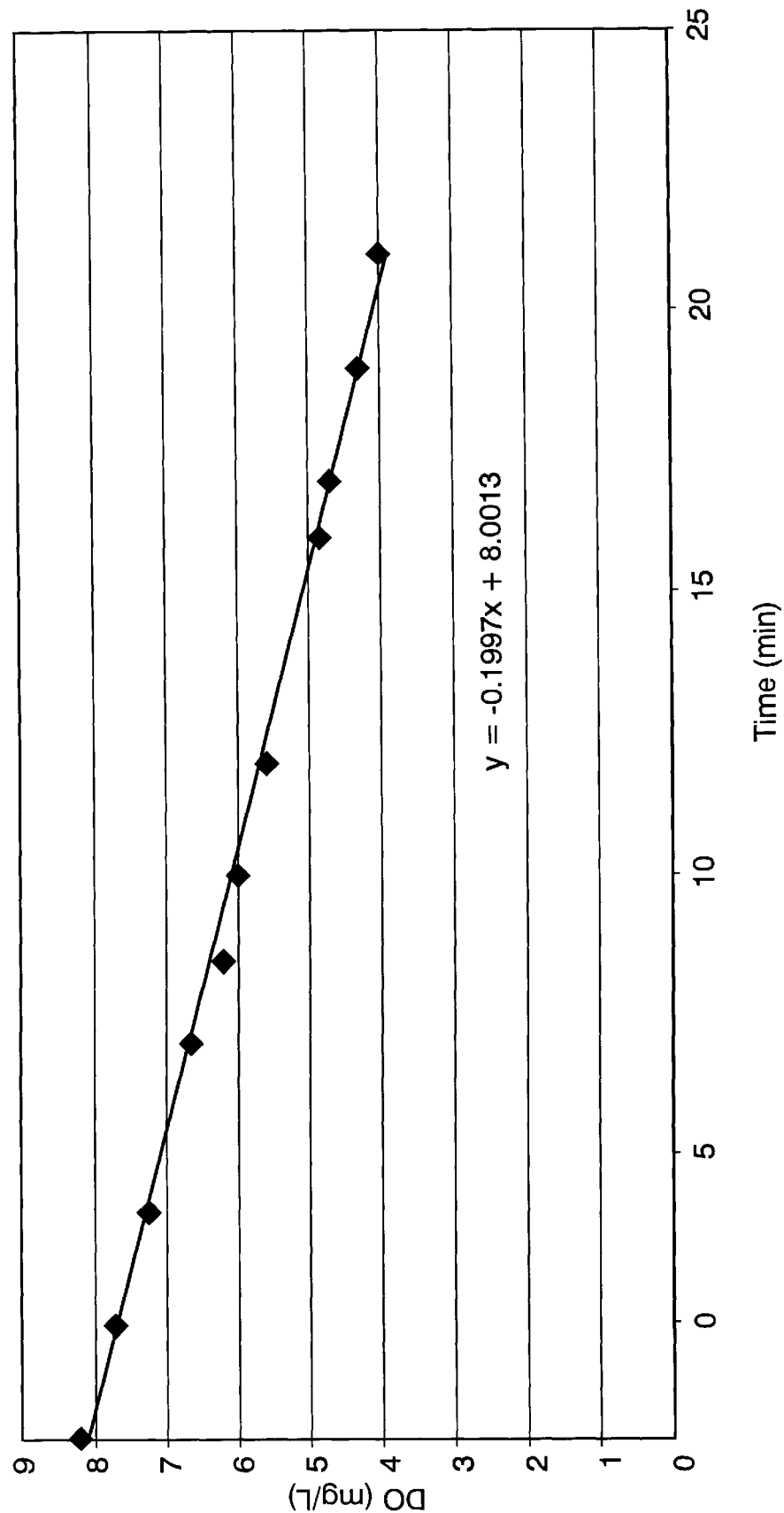
FIG. 4 is a graph showing the DO uptake for Nylon Bio-Sep.

In this experiment the oxygen uptake rate of benzoic acid degrading bacteria immobilized in Nylon and Nomex Bio- Sep beads was compared as a measure of the amount of the biomass loading in the beads. The Nomex and Nylon Bio-Sep beads used in this experiment originated in the incubator shaker cultures described previously in which biomass loading was compared using phospholipid fatty acid analysis. Specifically Nylon and Nomex beads were removed from these cultures after 53 days of incubation and daily feeding as described in Example 4. In each case, Nylon and Nomex Bio-Sep beads were washed with mineral salts medium that contained no carbon or energy source. Ten mL bulk volume (approximately 250 beads) of Nylon or Nomex Bio-Sep beads were then transferred to 300-mL BOD (biological oxygen demand) bottles containing an air-saturated (at room temperature—about 20 C) mineral salts medium that contained no carbon or energy source. The initial dissolved oxygen concentration was about 8 mg/L. Beads were kept in suspension using a magnetic stirrer. To each bottle was added 2.5 mL of a 40 mg/L solution of benzoic acid and a dissolved oxygen probe inserted. The dissolved oxygen probe was made to fit the BOD bottle without leaving an air gap. In each case the dissolved oxygen content of each suspension was monitored with time using a Yellow Springs Instruments DO meter. Dissolved oxygen levels in each bottle are shown as a function of time in FIGS. 3 and 4. As seen in these Figures the oxygen uptake rates (mg/L-min) in these two experiments were virtually identical. Since the number and loading history of the Nylon or Nomex beads used in these experiments were the same, one can conclude that the Nomex and Nylon Bio-Sep beads contained equivalent numbers of benzoic acid degrading bacteria. FIG. 3 shows the DO uptake for Nomex Bio-Sep and FIG. 4, for Nylon Bio-Sep.

Example 7

Adsorption properties of Bio-Sep Beads

The adsorptive properties of PAC incorporated in Nomex and Nylon Bio-Sep beads were investigated by examining the adsorption of p-nitrophenol (PNP) from dilute aqueous solution using a constant concentration of PNP and varying numbers of Nylon or Nomex Bio-Sep beads (75% by weight PAC). Data were analyzed using a Freudlich isotherm model to give Freudlich constants of $K_F$ of 0.142 and n of 0.303 for Nylon Bio-Sep and a $K_F$ of 0.108 and n of 0.321 for Nomex Bio-Sep. $K_F$ has units of g/g and is indicative of the sorption capacity of the beads (Weber, W. J.; McGinley, P. M.; Katz, L. E., *Environmental Science and Technology*, 26,1955–1962 (1992)). However, it must be noted that the Nomex Bio-Sep beads, once dried in preparation for the experiment, were difficult to re-wet. This led to floating beads and the possible inaccessibility of some PAC surface to the PNP.

The above non-limiting examples are merely provided to more clearly illustrate the aspects of the invention and are not intended to limit the scope of the invention.

Changes may be made in the construction and the operation of various components, elements and assemblies described herein or in the steps or the sequence of steps of the methods described herein without departing from the spirit and scope of the invention as defined in the following claims.

What is claimed is:

1. An improved bioreactor comprising porous polymeric beads having finely divided particles of activated carbon powder dispersed therein and having biocatalytic material contained in macropores of the beads, the polymer being soluble in a water miscible organic solvent and substantially insoluble in water, the improvement comprising the polymer being poly(hexamethyleneadipamide) or poly(caproamide).

2. A bioreactor comprising porous polymeric beads having finely divided particles of activated carbon powder dispersed therein and having biocatalytic material contained in macropores of the beads, the polymer being poly (hexamethyleneadipamide) or poly(caproamide).

3. The bioreactor of claim 1 or 2 wherein the carbon powder amounts to between about ¾ and about 7 times the weight of the polymer.

4. The bioreactor of claim 1 or 2 wherein the bead has a BET specific surface area, indicative of microporosity, of at least about 100 square meters per gram (100 $m^2/g$).

5. The bioreactor of claim 1 or 2 wherein the bead has a mercury intrusion volume, indicative of macroporosity, in the range of about 1.2 to about 2.5 cubic centimeters per gram.

6. The bioreactor of claim 1 or 2 wherein the bead has a void volume of at least about 40% of total bead volume.

* * * * *

UNITED STATES PATENT AND TRADEMARK OFFICE
CERTIFICATE OF CORRECTION

PATENT NO.     : 6,471,864 B1
DATED          : October 29, 2002
INVENTOR(S)    : Thomas I. Bair It is certified that error appears in the above-identified patent and that said Letters Patent is hereby corrected as shown below:

<u>Title page,</u>
Item [75], all inventors except "Thomas I. Bair" should be deleted.

Signed and Sealed this

Eleventh Day of February, 2003

JAMES E. ROGAN
*Director of the United States Patent and Trademark Office*